US012293761B2

United States Patent
Uchida

(10) Patent No.: US 12,293,761 B2
(45) Date of Patent: May 6, 2025

(54) VOICE INPUT APPARATUS, VOICE INPUT SYSTEM, AND INPUT VOICE PROCESSING METHOD

(71) Applicant: JVCKENWOOD CORPORATION, Yokohama (JP)

(72) Inventor: Takayuki Uchida, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 239 days.

(21) Appl. No.: 17/994,603

(22) Filed: Nov. 28, 2022

(65) Prior Publication Data

US 2023/0088519 A1 Mar. 23, 2023

Related U.S. Application Data

(63) Continuation of application No. PCT/JP2021/020128, filed on May 27, 2021.

(30) Foreign Application Priority Data

May 29, 2020 (JP) .................. 2020-094795
May 29, 2020 (JP) .................. 2020-094797

(51) Int. Cl.
*H04R 25/00* (2006.01)
*G10L 15/22* (2006.01)
*H04R 1/10* (2006.01)

(52) U.S. Cl.
CPC ............ *G10L 15/22* (2013.01); *H04R 1/1016* (2013.01)

(58) Field of Classification Search
CPC ................. G10L 15/22; H04R 1/1016
USPC ........................................ 381/380
See application file for complete search history.

(56) References Cited

U.S. PATENT DOCUMENTS

| | | | | |
|---|---|---|---|---|
| 11,172,285 B1 * | 11/2021 | Li | ................ | H04R 1/1016 |
| 11,223,915 B2 * | 1/2022 | McKinney | ............ | H04R 25/604 |
| 2015/0245131 A1 * | 8/2015 | Facteau | ................ | G02C 11/06 |
| | | | | 381/151 |
| 2021/0176558 A1 * | 6/2021 | Li | ................ | H04R 1/1083 |
| 2021/0211801 A1 * | 7/2021 | Perez | ................ | H04R 5/033 |
| 2022/0369029 A1 * | 11/2022 | Ma | ................ | H04R 3/04 |

(Continued)

FOREIGN PATENT DOCUMENTS

| | | |
|---|---|---|
| CN | 111131947 A | 5/2020 |
| JP | 2019-195179 A | 11/2019 |
| JP | 2020-30780 A | 2/2020 |

*Primary Examiner* — William J Deane, Jr.
(74) *Attorney, Agent, or Firm* — Nath, Goldberg & Meyer; Jerald L. Meyer

(57) ABSTRACT

A voice input apparatus includes first to third microphones and a controller. The first microphone collects a voice at a first position outside an ear canal of a speaker, and outputs a first input voice signal. The second microphone collects a voice at a second position outside the ear canal of the speaker and closer to a mouth of the speaker than the first position, and outputs a second input voice signal. The third microphone collects a voice inside the ear canal of the speaker, and outputs a third input voice signal. The controller detects a sound pressure of the first input voice signal, sets reflection degrees of the second and third input voice signals according to the detected sound pressure, and generates an output voice signal including at least one of the second and third input voice signals based on the reflection degrees.

5 Claims, 6 Drawing Sheets

(56) References Cited

U.S. PATENT DOCUMENTS

2023/0164475 A1\* 5/2023 Chen .................... H04R 1/1041
381/74

\* cited by examiner

| DETERMINATION RESULT | OUTPUT VOICE SIGNAL SNst | |
|---|---|---|
| | SNtL | SNtR |
| VL < VR | ○ | — |
| VL > VR | — | ○ |

○ : TRANSMISSION
— : NON-TRANSMISSION

VOICE INPUT APPARATUS, VOICE INPUT SYSTEM, AND INPUT VOICE PROCESSING METHOD

CROSS REFERENCE TO RELATED APPLICATION

This is a continuation application on the basis of PCT application No. PCT/JP2021/020128 filed on May 27, 2021, which claims the benefit of priority from Japanese Patent Applications No. 2020-094795 and No. 2020-094797 filed on May 29, 2020, the entire contents of which are incorporated by reference herein.

BACKGROUND

The present invention relates to a voice input apparatus, a voice input system, and an input voice processing method.

Japanese Patent Application Laid-Open No. 2020-030780 (Patent Document 1) describes that a wireless headset equipped with a microphone and earphones is used as a voice input apparatus and that user's collected utterance is transmitted to an AI assistant. Japanese Patent Application Laid-Open No. 2019-195179 (Patent Document 2) also describes wireless earphones with a microphone that serve as a voice input apparatus.

When a speaker utters a voice to be transmitted to the AI assistant, toward a voice input apparatus such as wireless earphones with a microphone in loud ambient noise, the speaker's voice and the loud ambient noise are collected by the microphone of the voice input apparatus and then transmitted to the AI assistant. This may cause the AI assistant to fail to recognize the user's voice and make an appropriate response.

SUMMARY

According to a first aspect of the embodiments, there is provided a voice input apparatus including: a first microphone configured to collect a voice at a first position outside an ear canal of a speaker, and output a first input voice signal based on the collected voice; a second microphone configured to collect a voice at a second position outside the ear canal of the speaker and closer to a mouth of the speaker than the first position, and output a second input voice signal based on the collected voice; a third microphone configured to collect a voice inside the ear canal of the speaker, and output a third input voice signal based on the collected voice; a controller configured to detect a sound pressure of the first input voice signal, set a first reflection degree indicating a reflection degree of the second input voice signal and a second reflection degree indicating a reflection degree of the third input voice signal according to the detected sound pressure, and generate an output voice signal including at least one of the second input voice signal and the third input voice signal based on the first reflection degree and the second reflection degree; and a communication unit configured to transmit the output voice signal to an outside.

According to a second aspect of the embodiments, there is provided an input voice processing method including: acquiring as a first input voice signal, a voice collected at a first position outside an ear canal of a speaker; detecting a sound pressure of the first input voice signal; acquiring as a second input voice signal, a voice collected at a second position outside the ear canal of the speaker and closer to a mouth of the speaker than the first position; acquiring as a third input voice signal, a voice collected inside the ear canal of the speaker; setting a first reflection degree indicating a reflection degree of the second input voice signal and a second reflection degree indicating a reflection degree of the third input voice signal, according to the sound pressure of the first input voice signal; generating an output voice signal including at least one of the second input voice signal and the third input voice signal based on the first reflection degree and the second reflection degree; and transmitting the output voice signal to an outside.

According to a third aspect of the embodiments, there is provided a voice input system including: a first voice input apparatus; and a second voice input apparatus capable of communicating with the first voice input apparatus, wherein each of the first voice input apparatus and the second voice input apparatus comprising: a first microphone configured to collect a voice at a first position outside an ear canal of a speaker, and output a first input voice signal based on the collected voice; a second microphone configured to collect a voice at a second position outside the ear canal of the speaker and closer to a mouth of the speaker than the first position, and output a second input voice signal based on the collected voice; a third microphone configured to collect a voice inside the ear canal of the speaker, and output a third input voice signal based on the collected voice; a controller configured to detect a sound pressure of the first input voice signal, set a first reflection degree indicating a reflection degree of the second input voice signal and a second reflection degree indicating a reflection degree of the third input voice signal according to the detected sound pressure, and generate an output voice signal including at least one of the second input voice signal and the third input voice signal based on the first reflection degree and the second reflection degree; and a communication unit configured to transmit the output voice signal to an outside, wherein the controller of the first voice input apparatus determines whether a magnitude of the sound pressure of the first input voice signal in the second voice input apparatus is larger than a magnitude of the sound pressure of the first input voice signal in the first voice input apparatus, and sets the output voice signal to be transmitted to the outside, based on a determination result.

According to a fourth aspect of the embodiments, there is provided an input voice processing method including: acquiring as a first input voice signal, a voice collected at a first position outside an ear canal of a left ear of a speaker; detecting a sound pressure of the first input voice signal; acquiring as a second input voice signal, a voice collected at a second position outside the ear canal of the left ear of the speaker and closer to a mouth of the speaker than the first position; acquiring as a third input voice signal, a voice collected inside the ear canal of the left ear of the speaker, setting a first reflection degree indicating a reflection degree of the second input voice signal and a second reflection degree indicating a reflection degree of the third input voice signal, according to the sound pressure of the first input voice signal; generating a left output voice signal including at least one of the second input voice signal and the third input voice signal based on the first reflection degree and the second reflection degree; acquiring as a fourth input voice signal, a voice collected at a first position outside an ear canal of a right ear of the speaker, detecting a sound pressure of the fourth input voice signal; acquiring as a fifth input voice signal, a voice collected at a second position outside the ear canal of the right ear of the speaker and closer to the mouth of the speaker than the first position; acquiring as a sixth input voice signal, a voice collected inside the ear canal of the right ear of the speaker; setting a third reflection degree indicating a reflection degree of the fifth input voice signal and a fourth reflection degree indicating a reflection degree of the sixth input voice signal, according to the sound pressure of the fourth input voice signal; generating a right output voice signal including at least one of the fifth input voice signal and the sixth input voice signal based on the third reflection degree and the fourth reflection degree; determining whether a magnitude of the sound pressure of the fourth input voice signal is larger than a magnitude of the sound pressure of the first input voice signal; and setting at least one of the left output voice signal and the right output voice signal as an output voice signal to be transmitted to an outside, based on a determination result.

DETAILED DESCRIPTION

First Embodiment

A voice input apparatus according to the present embodiment will be described with reference to FIGS. 1, 2, using an earphone 91.

Figure 1:
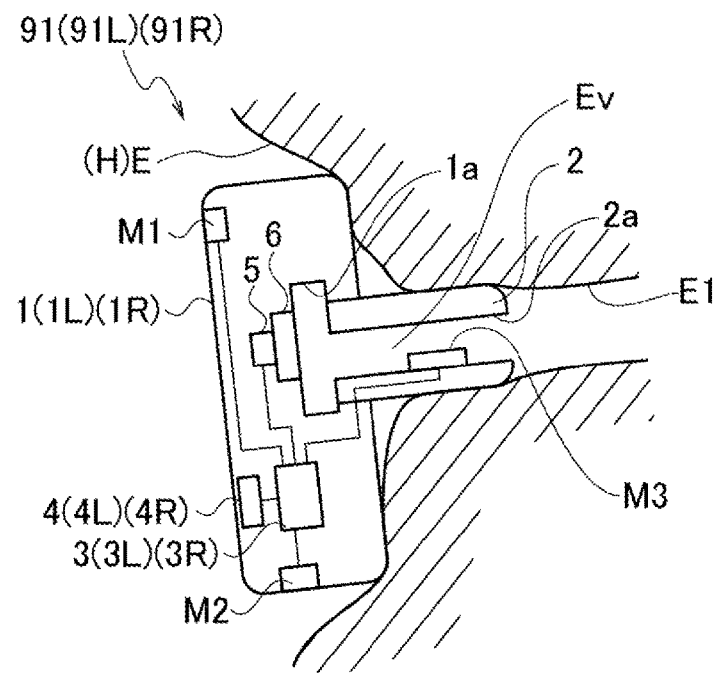
FIG. 1 is a schematic cross-sectional view of an earphone 91 which is a voice input apparatus according to a first embodiment.

FIG. 1 is a longitudinal cross-sectional view of an earphone 91. In FIG. 1, the earphone 91 is illustrated in a use state where the earphone 91 is mounted on an auricle E of a speaker H. FIG. 2 is a block diagram of the earphone 91.

The earphone 91 includes a main body 1 and an insertion portion 2 that protrudes from the main body 1 to be inserted into an ear canal E1. The main body 1 includes a first microphone M1, a second microphone M2, a control unit (controller) 3, a communication unit 4, a drive unit 5, and a speaker unit 6. The insertion portion 2 includes a third microphone M3. The control unit 3 includes a sound pressure detection section 3a and an input selection section 3b.

The main body 1 has an air chamber 1a on a sound emitting side of the speaker unit 6. The insertion portion 2 has a sound emission path 2a that communicates with the air chamber 1a. The sound emission path 2a has an open end.

In the use state of the earphone 91, a sound output from the speaker unit 6 by operation of the drive unit 5 passes through the air chamber 1a and the sound emission path 2a, and then is emitted into the ear canal E1. Under this configuration, the earphone 91 allows the communicate unit 4 to receive a voice signal transmitted wirelessly from an external voice reproduction device, and allows the speaker unit 6 to reproduce the voice signal using the control unit 3 and drive unit 5.

In the use state of the earphone 91, the first microphone M1 is positioned at a first position, which is one part of the main body 1 that is far from a mouth of the speaker H, and collects a sound around the main body 1. In the use state of the earphone 91, the second microphone M2 is positioned at a second position, which is another prat of the main body 1 that is closer to the mouth of the speaker H, and mainly collects a voice uttered by the speaker H as an air-conduction sound. Namely, in the use state of the earphone 91, the second microphone M2 is positioned closer to the mouth of the speaker H than the first microphone M1.

Hereafter, a sound around the main body 1 is also referred to simply as ambient sound. A third microphone M3 is an air-conduction microphone and is positioned at a third position facing the sound emission path 2a of the insertion portion 2. In the use state of the earphone 91, the third microphone M3 collects an air-conduction sound generated by reverberation of the voice, which was uttered by the speaker H and reached the ear canal E1 as a bone-conduction sound, in the ear canal E1 and an inner space Ev of the sound emission path 2a. Namely, the first position of the first microphone M1 is outside the ear canal E1 of the speaker H. The second position of the second microphone M2 is outside the ear canal E1 of the speaker H, closer to the mouth of the speaker H than the first position. The third microphone M3 is located in the ear canal E1 of speaker H.

The sound pressure detection section 3a of the control unit 3 detects a sound pressure of an input voice signal SN1, which is a first input voice signal from the first microphone M1, and outputs it as a detected voice signal SN1a. The sound pressure of the input voice signal SN1 is detected as an equivalent noise level (LAeq), for example. The sound pressure of the detected voice signal SN1a, which is detected as the equivalent noise level (LAeq) by the sound pressure detection section 3a, is referred to as a sound pressure Va below. Since the first microphone M1 mainly collects the ambient sound as described above, the sound pressure Va can be regarded as the sound pressure of the ambient sound.

Figure 2:
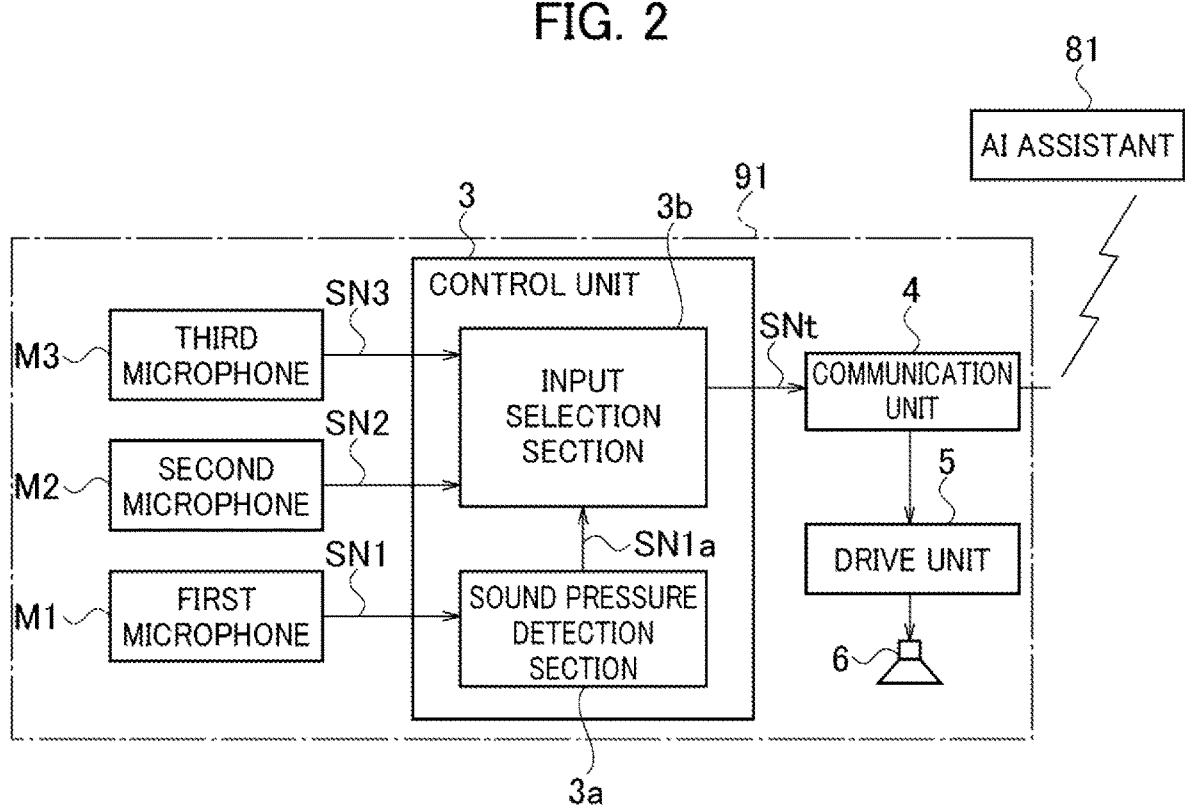
FIG. 2 is a block diagram of the earphone 91.

As illustrated in FIG. 2, an input voice signal SN2 which is a second input voice signal from the second microphone M2, an input voice signal SN3 which is a third input voice signal from the third microphone M3, and the detected voice signal SN1a from the sound pressure detection section 3a, are input to the input selection section 3b of the control unit 3. The input selection section 3b generates an output voice signal SNt and outputs it toward the communication unit 4. At this time, the input selection section 3b sets a reflection degree RF1 of the input voice signal SN2 and a reflection degree RF2 of the input voice signal SN3 in the output voice signal SNt, based on the sound pressure Va of the detected voice signal SN1a. The reflection degrees RF1, RF2 are indexes indicating a degree to which the input voice signal SN2 is reflected in the output voice signal SNt, and a degree to which the input voice signal SN3 is reflected in the output voice signal SNt, respectively. Each of the indexes is, for example, a magnitude of sound pressure. The reflection degrees RF1, RF2 are also referred to as a first reflection degree and a second reflection degree, respectively.

In other words, the sound pressure detection section 3*a* acquires the voice collected at the first position outside the ear canal E1 of the speaker H as the first input voice signal, and detects the sound pressure of the first input voice signal. The input selection section 3*b* acquires the voice collected at the second position outside the ear canal E1 of the speaker H as the second input voice signal. The input selection section 3*b* acquires the voice collected inside the ear canal E1 of the speaker H as the third input voice signal. The input selection section 3*b* sets the first reflection degree indicating the reflection degree RF1 of the second input voice signal and the second reflection degree indicating the reflection degree RF2 of the third input voice signal, according to the sound pressure of the first input voice signal. The input selection section 3*b* generates the output voice signal including at least one of the second input voice signal and the third input voice signal based on the first reflection degree and the second reflection degree. The input selection section 3*b* transmits the generated output voice signal to the outside.

As one example, the input selection section 3*b* sets the reflection degrees RF1, RF2 such that one of them is set as "reflected" and the other of them is set as "not reflected". More specifically, the input selection section 3*b* sets the reflection degrees RF1. RF2 as a mode in which one of two choices is selected, the two choices having one choice in which the reflection degree RF1 is reflected and the reflection degree RF2 is not reflected and another choice in which the reflection degree RF1 is not reflected and the reflection degree RF2 is reflected. The input selection section 3*b* sets as the output voice signal SNt, one of the input voice signals SN2, SN3 by selecting one of the two choices according to the sound pressure Va of the detected voice signal SN1*a*.

In other words, the input selection section 3*b* generates the output voice signal SNt by alternatively selecting one of the input voice signals SN2, SN3 according to the sound pressure Va of the detected voice signal SN1*a*, and then setting the selected input voice signal as the output voice signal SNt. Thereby, the output voice signal SNt includes at least one of the input voice signals SN2, SN3.

The communication unit 4 wirelessly transmits the output voice signal SNt from the input selection section 3*b* to the outside of the earphone 91. Wireless transmission is performed by Bluetooth (registered trademark), for example.

Figure 3:
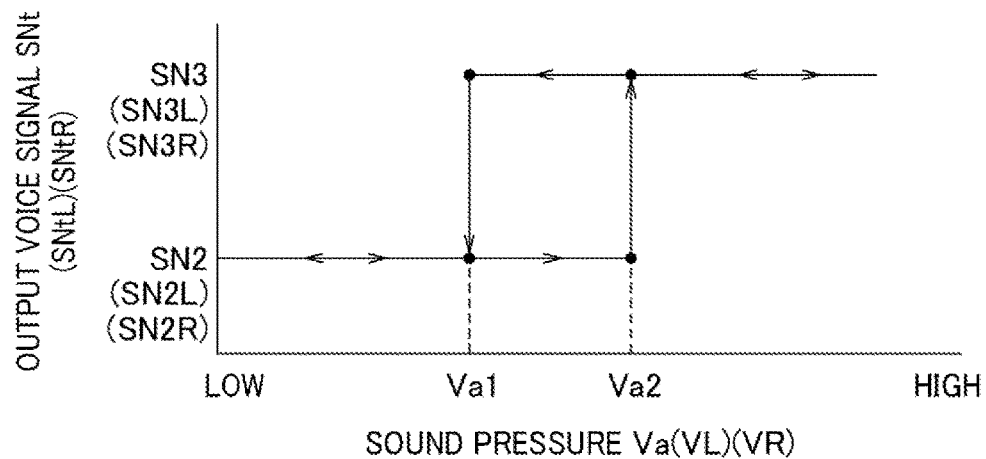
FIG. 3 is a diagram showing operation of the earphone 91.

Next, an input voice processing method by operation of the input selection section 3*b* will be described in detail with reference to FIG. 3. FIG. 3 is a diagram in which a horizontal axis is set as the sound pressure Va, and a vertical axis is set as the input voice signal SN2 from the second microphone M2 and the input voice signal SN3 from the third microphone M3 which are alternatively selected as the output voice signal SNt. A lower switching sound pressure Va1 in a first sound pressure and an upper switching sound pressure Va2 in a second sound pressure which is greater than the lower switching sound pressure Va1, are set in advance, using values of the sound pressure Va.

The input selection section 3*b* selects the input voice signal SN2 when the sound pressure Va is less than the lower switching sound pressure Va1, and sets the selected input voice signal SN2 as the output voice signal SNt. The input selection section 3 selects the input voice signal SN3 when the sound pressure Va exceeds the upper switching sound pressure Va2, and sets the selected input voice signal SN3 as the output voice signal SNt.

In a state where the input voice signal SN2 is set as the output voice signal SNt, if the sound pressure Va increases and exceeds the upper switching sound pressure Va2, the input selection section 3*b* switches the input voice signal SN2 to the input voice signal SN3, and sets the input voice signal SN3 as the output voice signal SNt. In a state where the input voice signal SN3 is set as the output voice signal SNt, if the sound pressure Va decreases and becomes lower than the lower switching sound pressure Va1, the input selection section 3*b* switches the input voice signal SN3 to the input voice signal SN2, and sets the input voice signal SN2 as the output voice signal SNt.

In other words, when the ambient sound is low, the earphone 91 transmits the voice of the speaker H, which was collected as air-conduction sound outside the ear canal E1 by the second microphone M2, to the outside as the output voice signal SNt. When the ambient sound is loud, the earphone 91 transmits the voice of the speaker H, which was collected inside the ear canal E1 as air-conduction sound through bone-conduction sound by the third microphone M3, to the outside as the output voice signal SNt.

The voice of the speaker H, which was collected as air-conduction sound through bone-conduction sound or as bone-conduction sound in the ear canal E1, is less clear than the voice of the speaker H, which was collected as air-conduction sound outside the ear canal E1, but the former has a stable sound pressure with little influence from the ambient sound. Therefore, even if the ambient sound is loud, the earphone 91 can transmit the output voice signal SNt having a high sound pressure of the voice of the speaker H, without being buried in the ambient sound. If the ambient sound is low, the earphone 91 can transmit the voice of the speaker H, which was collected as air-conduction sound outside the ear canal E1, having a relatively high sound pressure of the voice of the speaker H, as the clearer output voice signal SNt.

As shown in FIG. 3, in the earphone 91, the upper switching sound pressure Va2, which is a threshold for switching the output voice signal SNt from the input voice signal SN2 to the input voice signal SN3 by the input selection section 3*b*, and the lower switching sound pressure Va1, which is a threshold for switching the output voice signal SNt from the input voice signal SN3 to the input voice signal SN2 by the input selection section 3*b*, are set to different values. Specifically, the upper switching sound pressure Va2 is set higher than the lower switching sound pressure Va1.

By setting the upper switching sound pressure Va2 and the lower switching sound pressure Va1 such that the values of them differs from each other, even if a value of the sound pressure Va of the ambient sound collected by the first microphone M1 frequently changes around the lower switching sound pressure Va1 or the upper switching sound pressure Va2, it is possible to avoid a phenomenon where the sound pressure or the sound quality of the output voice signal SNt becomes unstable due to the output voice signal SNt frequently switching between the input voice signal SN2 and the input voice signal SN3. This prevents the AI assistant 81 from experiencing a decrease in a voice recognition rate according to fluctuations in the sound pressure of the ambient sound collected by the earphone 91.

In addition, by setting the upper switching sound pressure Va2 higher than the lower switching sound pressure Va1, when an increase and decrease fluctuation of the sound pressure Va is reversed between the lower switching sound pressure Va1 and the upper switching sound pressure Va2, a problem of not being able to switch to the input sound signal to be selected is prevented.

A value of the lower switching sound pressure Va1 and a value of the upper switching sound pressure Va2 are set appropriately by a manufacturer side to maintain a high recognition rate of the AI assistant 81 according to an environment in which the earphone 91 is used or the like. Not only this, the speaker H can adjust the value of the lower switching sound pressure Va1 and the value of the upper switching sound pressure Va2 according to the environment in which the earphone 91 is used.

As described above, the earphone 91 maintains the sound pressure of the voice uttered by the speaker H at a high level in the output voice signal SNt to be generated by the control unit 3 and transmitted from the communication unit 4, regardless of the loudness of the ambient sound around the main body 1. This increases a recognition rate of the voice of the speaker H by the AI assistant 81 that receives the output voice signal SNt.

The earphone 91 detailed above is not limited to the configuration and the procedure described above, and may be modified to the extent that it does not depart from the gist of the invention.

First Modified Example

Figure 4:
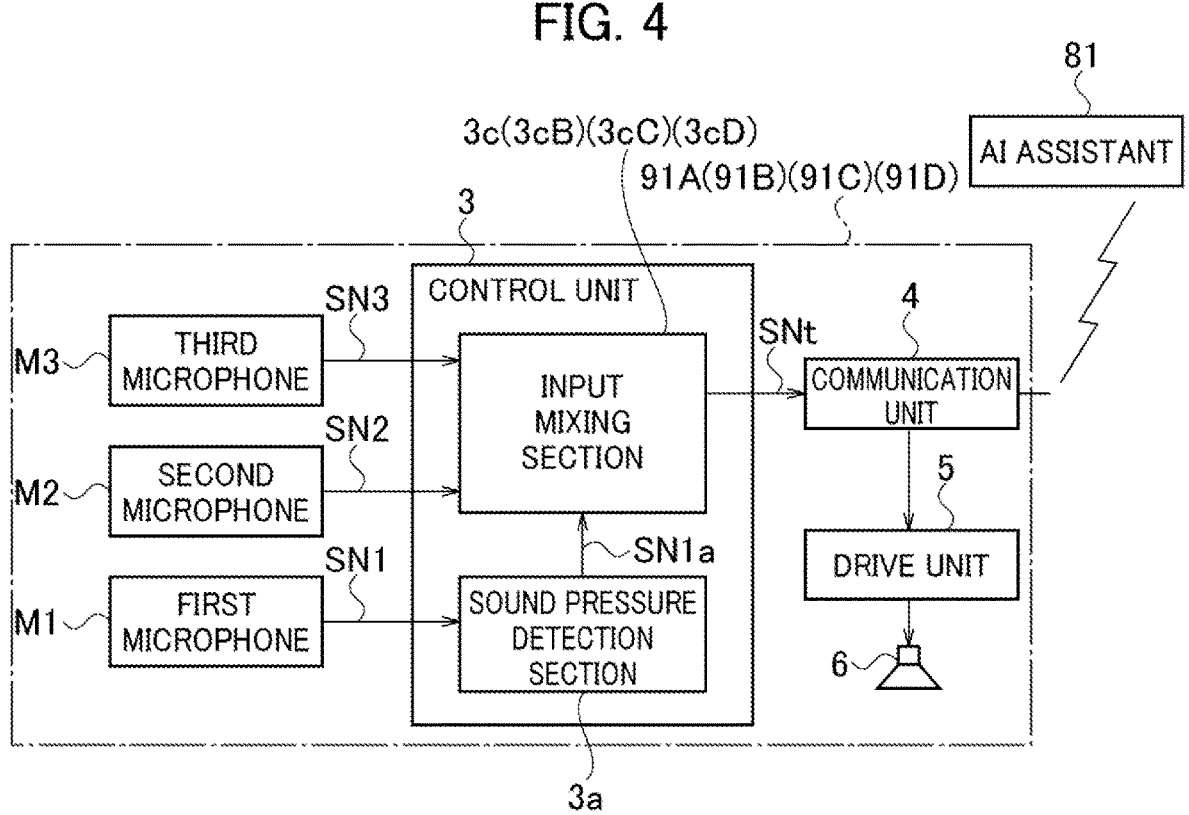
FIG. 4 is a block diagram of an earphone 91A in a first modified example of the voice input apparatus according to the first embodiment.
Figure 5:
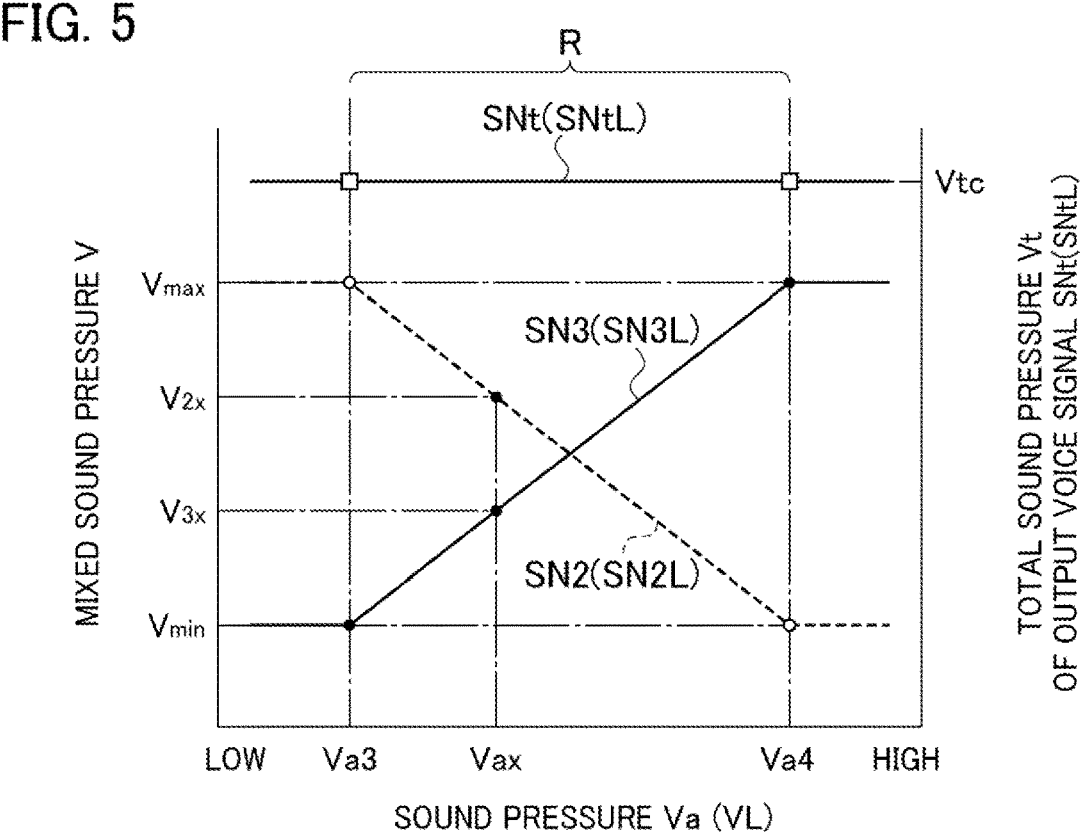
FIG. 5 is a diagram showing operation of the earphone 91A.

FIG. 4 is a block diagram of an earphone 91A in a first modified example of the voice input apparatus according to the present embodiment. FIG. 5 is a diagram showing operation of the earphone 91A. As illustrated in FIG. 4, in the earphone 91A, the input selection section 3b of the earphone 91 is replaced with an input mixing section 3c, and the rest of the configuration is the same as the earphone 91.

The input voice signal SN2 from the second microphone M2, the input voice signal SN3 from the third microphone M3, and the detected voice signal SN1a from the sound pressure detection section 3a are input to the input mixing section 3c of the control unit 3. The input mixing section 3c mixes the input voice signals SN2, SN3 at respective sound pressure ratios corresponding to the sound pressure Va of the detected voice signal SN1a to generate a mixed input voice signal, and outputs the mixed input voice signal to the communication unit 4 as the output voice signal SNt. The input mixing section 3c sets the reflection degree RF1 of the input voice signal SN2 by a ratio of sound pressures, and sets the reflection degree RF2 of the input voice signal SN3 in the output voice signal SNt by a ratio of sound pressures. The ratio of sound pressures is a ratio of the sound pressure of the input voice signal SN2 and the sound pressure of the input voice signal SN3 included in the output voice signal SNt.

An input voice processing method by operation of the input mixing section 3c will be described with reference to FIG. 5. In FIG. 5, a horizontal axis is a linear axis of the sound pressure Va, a vertical left axis is a linear axis of the mixed sound pressure V of the input voice signal SN2 and the mixed sound pressure V of the input voice signal SN3, and a vertical right axis is a total sound pressure Vt of the output voice signal SNt. The total sound pressure Vt is a sound pressure of the mixed input voice signal generated by mixing the input voice signals SN2, SN3. It is noted that there may be a case where one of the input voice signals SN2. SN3 is 0 (zero).

As shown in FIG. 5, a lower limit mixed sound pressure Va3 and an upper limit mixed sound pressure Va4, which is greater than the lower limit mixed sound pressure Va3, are set in advance, using values of the sound pressure Va. Hereafter, a range including sound pressures which are greater than or equal to the lower limit mixed sound pressure Va3 and lower than or equal to the upper limit mixed sound pressure Va4 in the sound pressure Va, is also referred to as a mixing range R in the sound pressure Va. In addition, for each of the input voice signals SN2, SN3, a minimum mixed sound pressure Vmin which is a minimum sound pressure to be mixed, and a maximum mixed sound pressure Vmax which is a maximum sound pressure to be mixed, are set in advance. A value of the minimum mixed sound pressure Vmin may be 0 (zero).

When the sound pressure Va is less than the lower limit mixed sound pressure Va3, the input mixing section 3c sets the input voice signal SN2 as the maximum mixed sound pressure Vmax and sets the input voice signal SN3 as the minimum mixed sound pressure Vmin. When the sound pressure Va is greater than the upper limit mixed sound pressure Va4, the input mixing section 3c sets the input voice signal SN2 as the minimum mixed sound pressure Vmin and sets the input voice signal SN3 as the maximum mixed sound pressure Vmax. In the mixing range R of the sound pressure Va, the input mixing section 3c decreases the mixed sound pressure V of the input voice signal SN2 as the sound pressure Va increases, and increases the mixed sound pressure V of the input voice signal SN3 as the sound pressure Va increases. In other words, the input mixing section 3c decreases the reflection degree RF1 of the input voice signal SN2 and increases the reflection degree RF2 of the input voice signal SN3 as the sound pressure Va increases. The input mixing section 3c linearly increases or decreases the mixing sound pressure V with respect to the sound pressure Va, in the mixing range R of the sound pressure Va, for example.

This allows the input mixing section 3c to generate the output voice signal SNt in any sound pressure Vax within the mixing range R of the sound pressure Va, by mixing the input voice signal SN2 at a mixed sound pressure V2x corresponding to the sound pressure Vax and the input voice signal SN3 at a mixed sound pressure V3x corresponding to the sound pressure Vax, and to output the generated output voice signal SNt to the communication unit 4.

Due to the above-described operation of the input mixing section 3c, the total sound pressure Vt of the output voice signal SNt becomes a constant total sound pressure Vtc, regardless of the magnitude of the sound pressure Va.

Values of the lower limit mixed sound pressure Va3, the upper limit mixed sound pressure Va4, the minimum mixed sound pressure Vmin, and the maximum mixed sound pressure Vmax are set appropriately by the manufacturer side such that a voice recognition rate of the AI assistant 81 is maintained at a high level, according to the use environment of the earphone 91A or the like. The values of the lower limit mixed sound pressure Va3, the upper limit mixed sound pressure Va4, the minimum mixed sound pressure Vmin, and the maximum mixed sound pressure Vmax may be adjustable by the speaker H.

According to the earphone 91A, w % ben the sound pressure Va of the ambient sound is in the mixing range R between the lower limit mixed sound pressure Va3 and the upper limit mixed sound pressure Va4, the input voice signals SN2, SN3 are mixed at the respective sound pressure ratios of the reflection degrees RF1, RF2 corresponding to the sound pressure Va. A ratio of the sound pressures to be mixed linearly and gradually changes according to an increase or decrease in the sound pressure of the ambient sound around the main body 1. For example, the reflection degree RF1 in the output voice signal SNt is represented by Vmax/Vmin when the sound pressure Va has the value Va3, is represented by V2x/V3x when the sound pressure Va has the value Vax, and is represented by Vmin/Vmax when the sound pressure Va has the value Va4.

Also, the reflection degree RF2 in the output voice signal SNt is represented by Vmin/Vmax when the sound pressure Va has the value Va3, is represented by V3x/V2x when the sound pressure Va has the value Vax, and is represented by Vmax/Vmin when the sound pressure Va has the value Va4. Therefore, since the change in sound quality of the output voice signal SNt in response to an increase or decrease in the ambient sound becomes gradual and smooth, the recognition rate of the voice, which is uttered by the speaker H, by the AI assistant 81 is maintained at a high level regardless of the sound pressure of the ambient sound around the main body 1. In addition, since the total sound pressure Vt of the output voice signal SNt is constant and does not change abruptly in the earphone 91A regardless of the increase or decrease of the ambient sound, the recognition rate of the voice, which is uttered by the speaker H, by the AI assistant 81 is maintained at a higher level.

Second Modified Example

The earphone 91A can be replaced with an earphone 91B in a second modified example of the voice input apparatus according to the present embodiment (see FIG. 4). The earphone 91B includes an input mixing section 3cB that changes the total sound pressure Vt of the output voice signal SNt according to the sound pressure Va, shown in FIG. 6, instead of the input mixing section 3c that keeps the total sound pressure Vt of the output voice signal SNt constant regardless of the sound pressure Va. (see FIG. 4).

Figure 6:
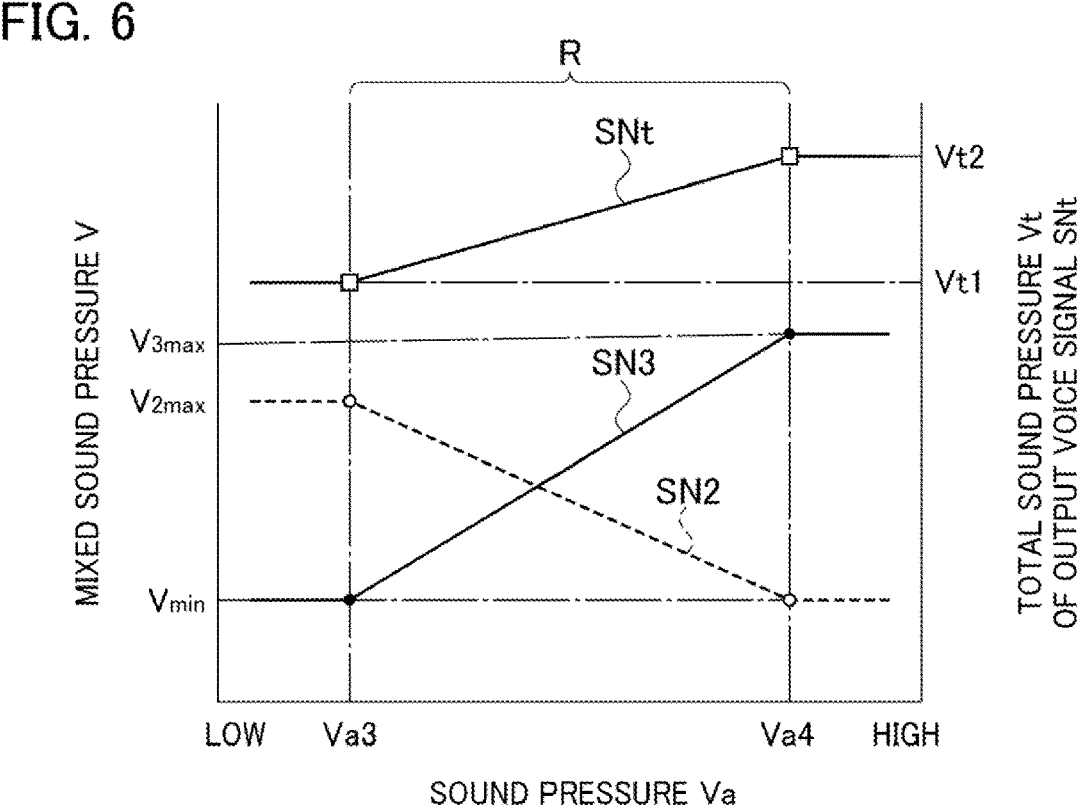
FIG. 6 is a diagram showing operation of an earphone 91B in a second modified example of the voice input apparatus according to the first embodiment.

The input mixing section 3cB increases the total sound pressure Vt as the sound pressure Va increases, in the mixing range R of the sound pressure Va, for example. More specifically, as shown in FIG. 6, the input mixing section 3cB performs mixing operation under a condition where a value of the maximum mixed sound pressure V2max of the input voice signal SN2 is different from a value of the maximum mixed sound pressure V3max of the input voice signal SN3. For example, the maximum mixed sound pressure V3max is greater than the maximum mixed sound pressure V2max. This causes the sound pressure in the output voice signal SNt to increase or decrease between a total sound pressure Vt1 in the lower limit mixed sound pressure Va3 and a total sound pressure Vt2 greater than the total sound pressure Vt1 in the upper limit mixed sound pressure Va4.

In a case where the total sound pressure Vt is constant, if the sound pressure Va is high, that is, the ambient sound is loud, a sound pressure ratio of the ambient sound, which is included in the input voice signal SN2 to some extent as background noise, becomes high. Therefore, in the mixing range R in the sound pressure Va, a sound pressure ratio of the ambient sound in the total sound pressure Vt of the output voice signal SNt becomes relatively high. In contrast, in the earphone 91B, a mixing ratio of the sound pressure of the input voice signal SN3 to the input voice signal SN2 becomes larger as the sound pressure Va increases. Therefore, the increase in the sound pressure ratio of the ambient sound in the total sound pressure Vt of the output voice signal SNt is suppressed. This stably maintains a voice recognition rate by the AI assistant 81 that receives the output voice signal SNt.

Third Modified Example

The earphone 91A can be replaced with an earphone 91C in a third modified example of the voice input apparatus according to the present embodiment (see FIG. 4). The earphone 91C includes an input mixing section 3cC that performs non-linear increase and decrease, shown in FIG. 7, instead of the input mixing section 3c (see FIG. 4).

Figure 7:
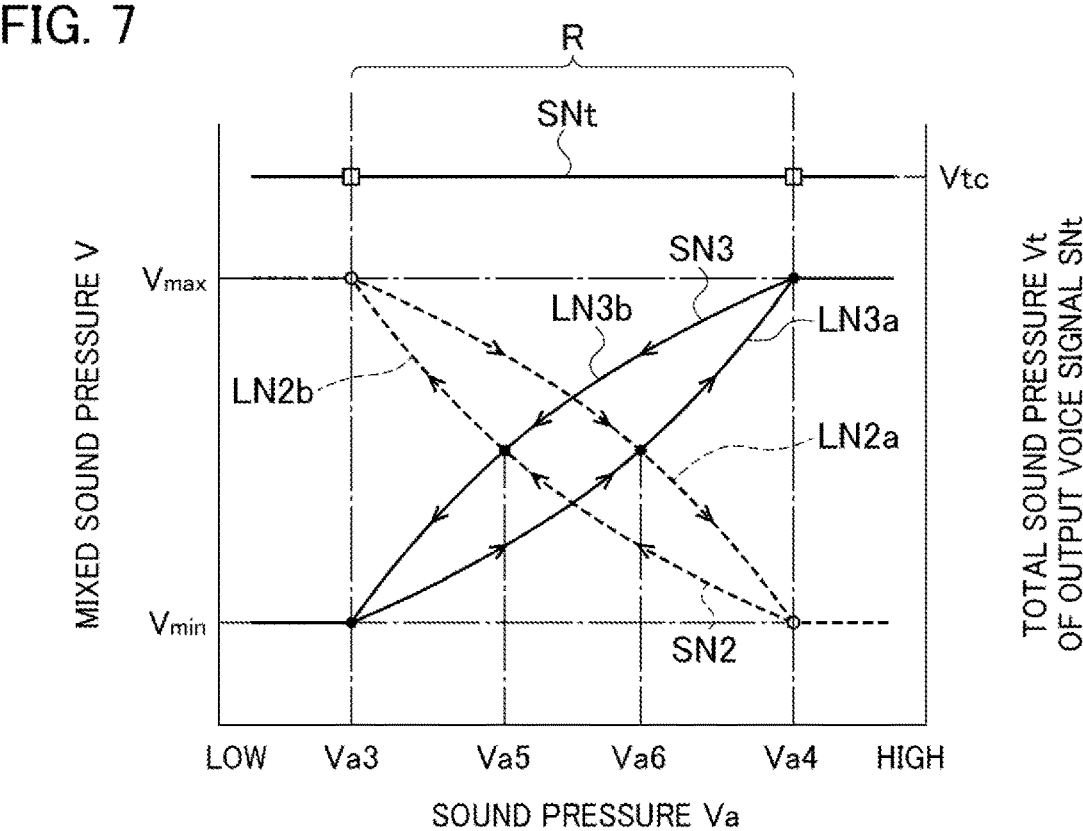
FIG. 7 is a diagram showing operation of an earphone 91C in a third modified example of the voice input apparatus according to the first embodiment.

As shown in FIG. 7, in the input mixing section 3cC, in the mixing range R in the sound pressure Va, a sound pressure Va5 at which the input voice signals SN2, SN3 are mixed at the same sound pressure when the sound pressure Va decreases with time, is set at a side closer to the lower limit mixed sound pressure Va3 than a midpoint between the lower limit mixed sound pressure Va3 and the upper limit mixed sound pressure Va4. In other words, the input mixing section 3cC performs a mixing of the input voice signals SN2, SN3 when the sound pressure Va decreases, based on non-linear characteristic lines LN2b, LN3b.

On the other hand, in the input mixing section 3cC, a sound pressure Va6 at which the input voice signals SN2, SN3 are mixed at the same sound pressure when the sound pressure Va increases with time, is set at a side closer to the upper limit mixed sound pressure Va4 than the midpoint between the lower limit mixed sound pressure Va3 and the upper limit mixed sound pressure Va4. In other words, the input mixing section 3cC performs a mixing of the input voice signals SN2. SN3 when the sound pressure Va increases, based on non-linear characteristic lines LN2a. LN3a.

The input mixing section 3cC changes the mixing ratio on the characteristic lines LN2a. LN3a, when the sound pressure Va does not reach the upper limit mixed sound pressure Va4 even though the sound pressure Va increases, and starts to decrease. The input mixing section 3cC changes the mixing ratio on the characteristic lines LN3b, LN2b, when the sound pressure Va does not reach the lower limit mixed sound pressure Va3 even though the sound pressure Va decreases, and starts to increase.

The input mixing section 3cC controls the mixing ratio of the input voice signals SN2, SN3 such that the total sound pressure Vt of the output voice signal SNt is a constant total sound pressure Vtc regardless of the magnitude of the sound pressure Va. The nonlinear characteristics of the input voice signals SN2, SN3 in FIG. 7 are set in advance by the manufacture of the earphone 91, or is set by adjustment by the speaker H.

If the sound pressure Va of the ambient sound is maintained at a relatively low level and is on a side close to the lower limit mixed sound pressure Va3 in the mixing range R, the earphone 91C mixes the input voice signals SN2. SN3 such that a ratio of the input voice signal SN2 to the input voice signal SN3 is higher, to generates the output voice signal SNt. Thereby, the earphone 91C gives priority to clarity of the voice. If the sound pressure Va of the ambient sound is maintained at a relatively high level and is on a side close to the upper limit mixed sound pressure Va4 in the mixing range R, the earphone 91C mixes the input voice signals SN2, SN3 such that a ratio of the input voice signal SN3 to the input voice signal SN2 is higher, to generates the output voice signal SNt. Thereby, the earphone 91C gives priority to a high sound pressure of the voice.

Thus, the earphone 91C generates the output voice signal SNt suitable for voice recognition, depending on a trend of increase or decrease of the sound pressure Va of the ambient sound. Therefore, the recognition rate of the voice, which is uttered by the speaker H, by the AI assistant 81, can be maintained at a higher level.

Fourth Modified Example

The earphone 91C can be replaced with an earphone 91D in a fourth modified example of the voice input apparatus according to the present embodiment (see FIG. 4). The earphone 91D includes an input mixing section 3cD that changes the total sound pressure Vt depending on the sound pressure Va, shown in FIG. 8, instead of the input mixing section 3cC (see FIG. 4).

Figure 8:
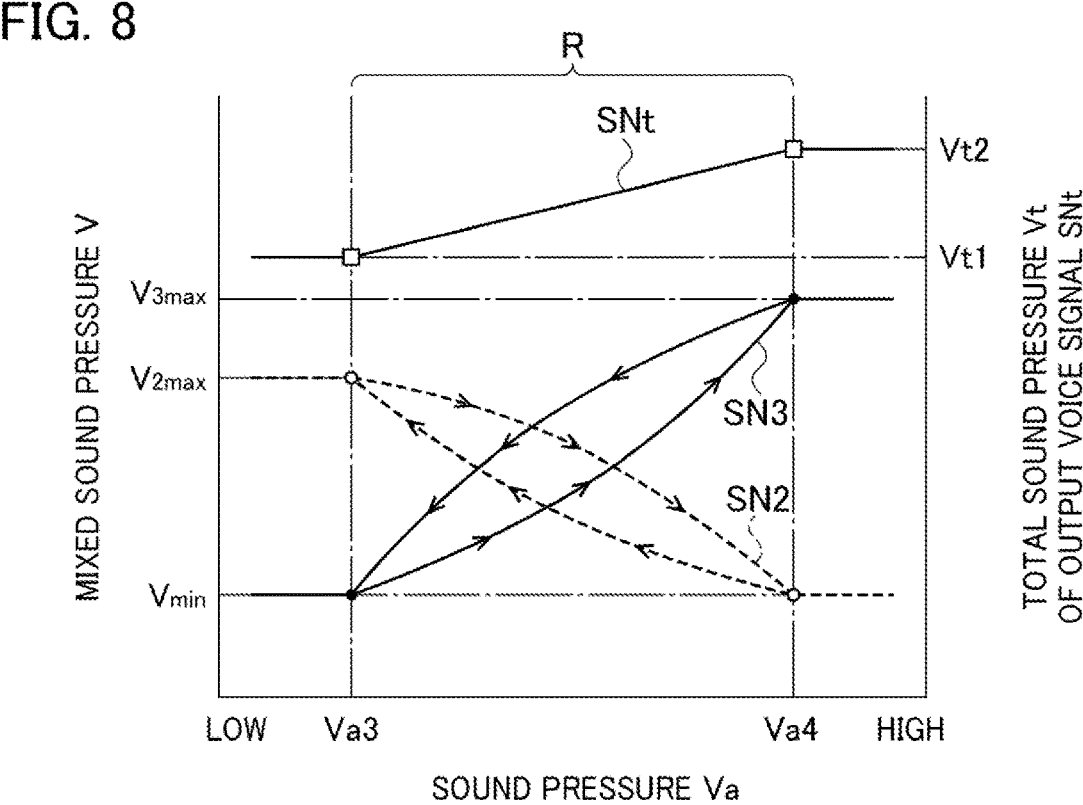
FIG. 8 is a diagram showing operation of an earphone 91D in a fourth modified example of the voice input apparatus according to the first embodiment.

The input mixing section 3cD increases the total sound pressure Vt as the sound pressure Va increases, in the mixing range R in the sound pressure Va, for example. More specifically, as shown in FIG. 8, the input mixing section 3cD performs mixing operation under a condition where a value of the maximum mixed sound pressure V2max of the input voice signal SN2 is different from a value of the maximum mixed sound pressure V3max of the input voice signal SN3. For example, the maximum mixed sound pressure V3max is greater than the maximum mixed sound pressure V2max. This causes the sound pressure of the output voice signal SNt to increase or decrease between the total sound pressure Vt1 in the lower limit mixed sound pressure Va3 and the total sound pressure Vt2 greater than the total sound pressure Vt1 in the upper limit mixed sound pressure Va4.

Thereby, as with the second modified example, in the earphone 91D, a mixing ratio of the sound pressure of the input voice signal SN3 to the input voice signal SN2 becomes larger as the sound pressure Va increases. Therefore, the increase in the sound pressure ratio of the ambient sound in the total sound pressure Vt of the output voice signal SNt is suppressed. This stably maintains a voice recognition rate by the AI assistant 81 that receives the output voice signal SNt.

It is noted that in a case where of each of the earphones 91, 91A-91D is sold as a product, it is not limited to sale as a single, but two or more may be sold as a pair.

If each of the earphones 91, 91A-91D is configured to be wearable for both a left ear and right ear, a pair of earphones 91, 91, a pair of earphones 91A, 91A, a pair of earphones 91B, 91B, a pair of earphones 91C. 91C, and a pair of earphones 91D. 91D may be sold for the left ear and the right ear. In addition, for the earphones 91, 91A-91D, three or more may be sold as a pairs, as an earphone with a microphone for one ear to be worn by each of a plurality of employees in a large store.

Second Embodiment

Figure 9:
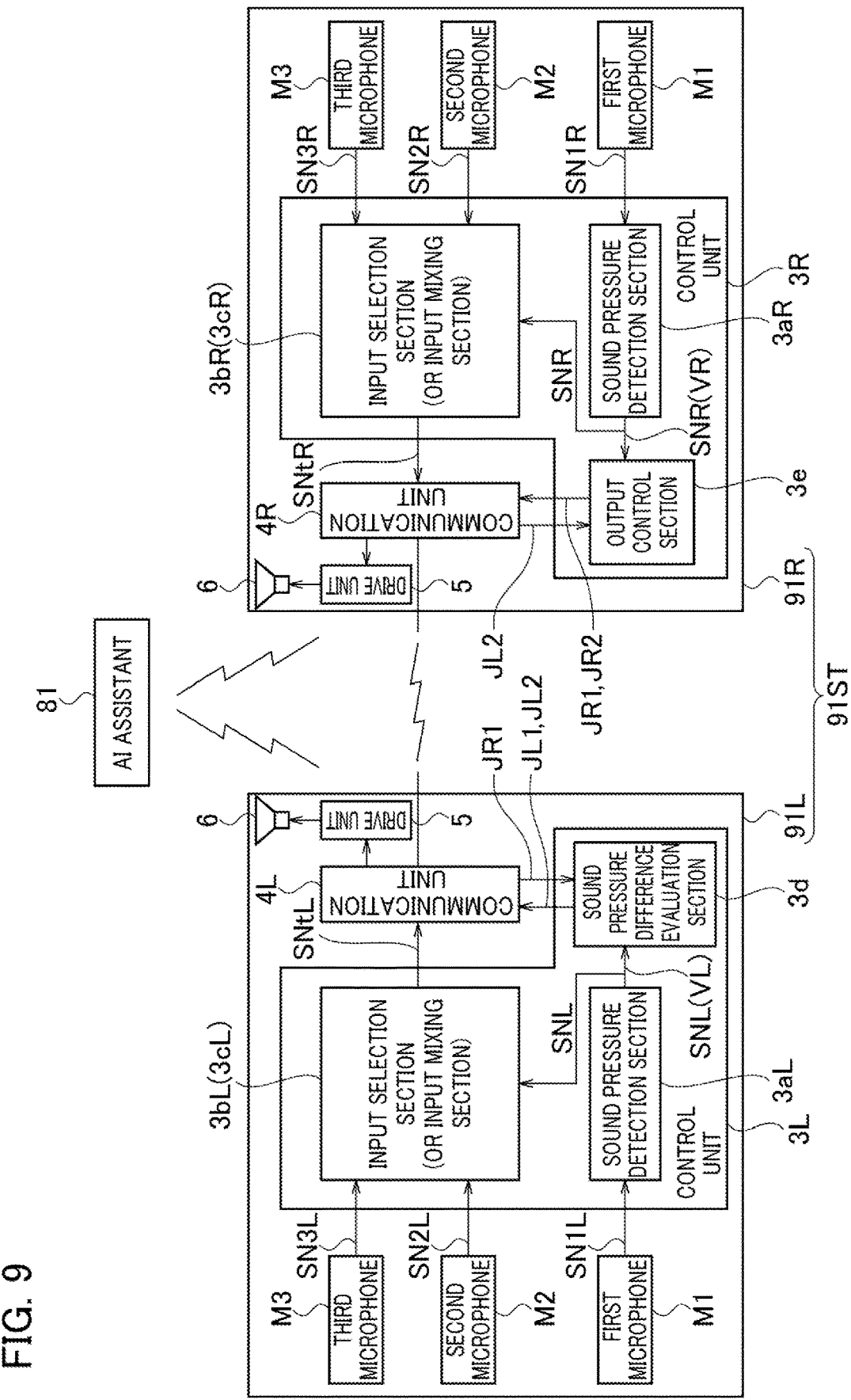
FIG. 9 is a block diagram of an earphone system 91ST which is a voice input system according to a second embodiment.
Figures 10, 11:
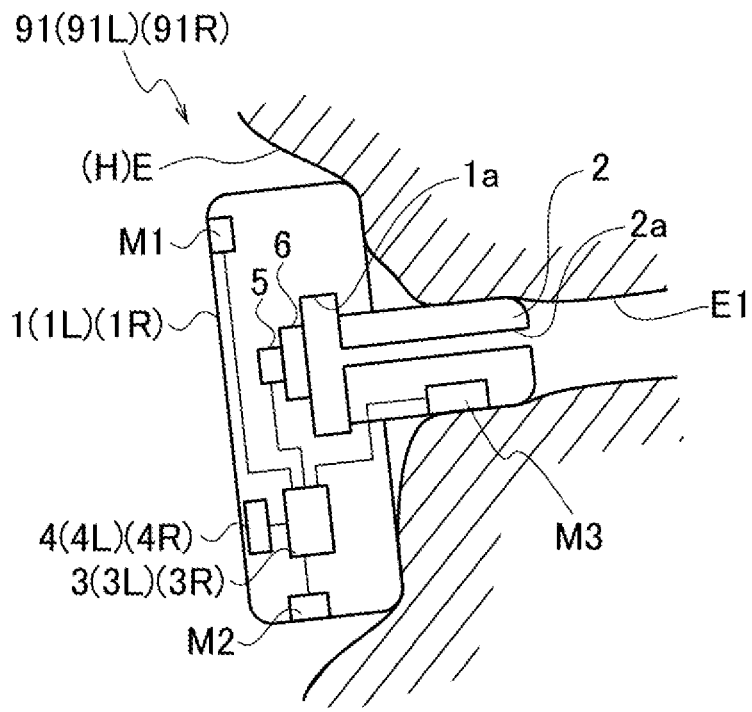
FIG. 10 is a table showing operation of the earphone system 91ST.
FIG. 11 is a schematic cross-sectional view illustrating an example of a mounting position when a third microphone M3 is a bone-conduction microphone.

A voice input system according to the present embodiment will be described mainly with reference to FIGS. 1, 9 and 10, using an earphone system 91ST. FIG. 9 is a block diagram of the earphone system 91ST, and FIG. 10 is a table showing operation of the earphone system 91ST.

As illustrated in FIG. 9, the earphone system 91ST is configured as a pair of an earphone 91L which is a first voice input apparatus, and an earphone 91R which is a second voice input apparatus. The earphone 91L is worn on a left ear of the speaker H, and the earphone 91R is worn on a right ear of the speaker H.

As illustrated in FIG. 1, the earphone 91L includes a main body 1L and an insertion portion 2, and the earphone 91R includes a main body 1R and an insertion portion 2. Configurations and placement positions of first to third microphones M1 to M3, a drive unit 5 and a speaker unit 6 in each of the earphones 91L, 91R are the same as those in the earphone 91 of the first embodiment. Hereafter, the same symbols are assigned to the same elements as in the earphone 91, and the different elements are distinguished by adding "L" and "R" at ends of symbols.

As illustrated in FIGS. 1, 9, the earphones 91L, 91R respectively include control units (controllers) 3L, 3R instead of the control unit 3 of the earphone 91, and respectively include communication units 4L, 4R instead of the communication unit 4 of the earphone 91.

In the earphone 91L, the main body 1L includes the first microphone M1, the second microphone M2, the control unit 3L, the communication unit 4L, the drive unit 5, and the speaker unit 6. The insertion portion 2 includes the third microphone M3. In the earphone 91R, the main body 1R incudes the first microphone M1, the second microphone M2, the control unit 3R, the communication unit 4R, the drive unit 5, and the speaker unit 6. The insertion portion 2 includes the third microphone M3.

As illustrated in FIG. 1, the main bodies 1L, 1R have air chambers 1a, 1a on sound emitting sides of the speaker units 6, 6, respectively. The insertion portions 2, 2 have sound emission paths 2a, 2a that communicate with the air chambers 1a, 1a, respectively. The sound emission paths 2a, 2a have open ends, respectively. In the use states of the earphones 91L, 91R, sounds output from the speaker units 6, 6 by operations of the drive units 5, 5 pass through the air chambers 1a, 1a and the sound emission paths 2a, 2a, and then are emitted into ear canals E1, E1 of the left and right ears, respectively. Under this configuration, the earphones 91L, 91R allow the communicate units 4L, 4R to receive a voice signal transmitted wirelessly from the external voice reproduction device, and allow the speaker units 6, 6 to reproduce the voice signal using the control units 3L, 3R and the drive units 5, 5, respectively. The earphones 91L, 91R can communicate with each other between the communication units 4L, 4R.

In the use states of the earphones 91L, 91R, the first microphones M1, M1 mounted to the main bodies 1L, 1R are positioned at first positions, each of which is one part of each of the main bodies 1L, 1R that is far from a mouth of the speaker H, and collect sounds around the main bodies 1L, 1R, respectively. In the use states of the earphones 91L, 91R, the second microphones M2, M2 mounted to the main bodies 1L, 1R are positioned at second positions, each of which is another prat of each of the main bodies 1L. 1R that is closer to the mouth of the speaker H, respectively. Namely, in the use states of the earphones 91L, 91R, the second microphones M2, M2 are positioned closer to the mouth of the speaker H than the first microphones M1, M1. The third microphones M3, M3 are air-conduction microphones and are positioned at third positions facing the sound emission paths 2a, 2a of the insertion portions 2, 2, respectively. In the use states of the earphones 91L, 91R, the third microphones M3, M3 collect air-conduction sounds generated by reverberation of the voice, which was uttered by the speaker H and reached the ear canals E1, E1 as bone-conduction sounds, in the ear canals E1, E1 and inner spaces Ev. Ev of the sound emission paths 2a, 2a, respectively. Namely, the first position of each of the first microphones M1, M1 is outside the ear canal E1 of the speaker H. The second position of each of the second microphones M2, M2 is outside the ear canal E1 of the speaker H, and closer to the mouth of the speaker H than the first position. Each of the third microphones M3, M3 is located in the ear canal E1 of speaker H.

As illustrated in FIG. 9, the control unit 3L of the earphone 91L includes a sound pressure detection section 3aL, an input selection section 3bL, and a sound pressure difference evaluation section 3d. The control unit 3R of the earphone 91R includes a sound pressure detection section 3aR, an input selection section 3bR, and an output control section 3e.

In the earphone 91L, the sound pressure detection section 3aL detects a sound pressure of an input voice signal SN1L from the first microphone M1, and outputs it to both the input selection section 3bL and the sound pressure difference evaluation section 3d, as a detected voice signal SNL. In the earphone 91R, the sound pressure detection section 3aR detects a sound pressure of an input voice signal SN1R from the first microphone M1, and outputs it to both the input selection section 3bR and the output control section 3e, as a detected voice signal SNR. It is noted that the input voice signals SN1L. SN1R are also referred to as a first input voice signal. The input voice signals SN1L, SN1R may be referred to as a first input voice signal and a fourth input voice signal, respectively.

The sound pressures of the input voice signals SN1L, SN1R are detected as equivalent noise levels (LAeq), for example. The sound pressures of the detected voice signals SNL, SNR, which are detected as the equivalent noise levels (LAeq) by the sound pressure detection sections 3aL, 3aR, are referred to as sound pressures VL, VR below, respectively.

The first microphone M1 mounted to the main body 1L collects the ambient sound around the main body 1L. The first microphone M1 mounted to the main body 1R collects the ambient sound around the main body 1R. Therefore, the sound pressure VL can be regarded as a sound pressure of the ambient sound around the earphone 91L for the left ear. The sound pressure VR can be regarded as a sound pressure of the ambient sound around the earphone 91R for the right ear.

The output control section 3e outputs to the communication unit 4R, sound pressure information JR1 including the sound pressure VR of the detected voice signal SNR, and communication control information JR2 (details are described below).

Input voice processing methods by operations of the input selection sections 3bL, 3bR of the earphones 91L, 91R are similar to that by the operation of the input selection section 3b of the earphone 91 in the first embodiment.

As illustrated in FIG. 9, an input voice signal SN2L which is a second input voice signal from the second microphone M2, an input voice signal SN3L which is a third input voice signal from the third microphone M3, and the detected voice signal SNL from the sound pressure detection section 3aL, are input to the input selection section 3bL of the control unit 3L. The input selection section 3bL generates an output voice signal SNtL and outputs it toward the communication unit 4L. At this time, the input selection section 3bL sets a reflection degree RF1L of the input voice signal SN2L and a reflection degree RF2L of the input voice signal SN3L in the output voice signal SNtL, based on the sound pressure VL of the detected voice signal SNL. The reflection degrees RF1L, RF2L are indexes indicating a degree to which the input voice signal SN2L is reflected in the output voice signal SNtL, and a degree to which the input voice signal SN3L is reflected in the output voice signal SNtL, respectively. Each of the indexes is, for example, a magnitude of sound pressure. The reflection degrees RF1L, RF2L are also referred to as a first reflection degree and a second reflection degree, respectively. The output voice signal SNtL is also referred to as a left side output voice signal.

In other words, the sound pressure detection section 3aL acquires the voice collected at the first position outside the ear canal of the left ear of the speaker H as the first input voice signal, and detects the sound pressure of the first input voice signal. The input selection section 3bL acquires the voice collected at the second position outside the ear canal of the left ear of the speaker H as the second input voice signal. The input selection section 3bL acquires the voice collected within the ear canal of the left ear of the speaker H as the third input voice signal. The input selection section 3bL sets the first reflection degree indicating the reflection degree RF1L of the second input voice signal and the second reflection degree indicating the reflection degree RF2L of the third input voice signal, according to the sound pressure of the first input voice signal. The input selection section 3bL generates the output voice signal SNtL including at least one of the second input voice signal and the third input voice signal based on the first reflection degree and the second reflection degree.

Similarly, an input voice signal SN2R which is a fifth input voice signal from the second microphone M2, an input voice signal SN3R which is a sixth input voice signal from the third microphone M3, and the detected voice signal SNR from the sound pressure detection section 3aR, are input to the input selection section 3bR of the control unit 3R. The input selection section 3bR generates an output voice signal SNtR and outputs it toward the communication unit 4R. At this time, the input selection section 3bR sets a reflection degree RF1R of the input voice signal SN2R and a reflection degree RF2R of the input voice signal SN3R in the output voice signal SNtR, based on the sound pressure VR of the detected voice signal SNR. The reflection degrees RF1R, RF2R are indexes indicating a degree to which the input voice signal SN2R is reflected in the output voice signal SNtR, and a degree to which the input voice signal SN3R is reflected in the output voice signal SNtR, respectively. Each of the indexes is, for example, a magnitude of sound pressure. The reflection degrees RF1R, RF2R are also referred to as a third reflection degree and a fourth reflection degree, respectively. The output voice signal SNtR is also referred to as a right side output voice signal.

In other words, the sound pressure detection section 3aR acquires the voice collected at the first position outside the ear canal of the right ear of the speaker H as the fourth input voice signal, and detects the sound pressure of the fourth input voice signal. The input selection section 3bR acquires the voice collected at the second position outside the ear canal of the right ear of the speaker H as the fifth input voice signal. The input selection section 3bR acquires the voice collected within the ear canal of the right ear of the speaker H as the sixth input voice signal. The input selection section 3bR sets the third reflection degree indicating the reflection degree RF1R of the fifth input voice signal and the fourth reflection degree indicating the reflection degree RF2R of the sixth input voice signal, according to the sound pressure of the fourth input voice signal. The input selection section 3bR generates the output voice signal SNtR including at least one of the fifth input voice signal and the sixth input voice signal based on the third reflection degree and the fourth reflection degree.

As one example, as shown in FIG. 3, the input selection section 3bL of the earphone 91L selects the input voice signal SN2L when the sound pressure VL of the detected voice signal SNL from the sound pressure detection section 3aL is less than the lower switching sound pressure Va1 set in advance, and sets the selected input voice signal SN2L as the output voice signal SNtL. In contrast, the input selection section 3bL selects the input voice signal SN3L when the sound pressure VL exceeds the upper switching sound pressure Va2, and sets the selected input voice signal SN3L as the output voice signal SNtL.

The input selection section 3bL outputs the output voice signal SNtL set as described above, to the communication unit 4L. Thus, the input selection section 3bL sets the reflection degree RF1L of the input voice signal SN2L and the reflection degree RF2L of the input voice signal SN3L in the output voice signal SNtL, according to the sound pressure VL of the detected voice signal SNL. In this example, the input selection section 3bL sets the reflection degrees RF1L, RF2L such that one of them is set as "reflected" and the other of them is set as "not reflected".

The input selection section 3bR of the earphone 91R selects the input voice signal SN2R when the sound pressure VR of the detected voice signal SNR from the sound pressure detection section 3aR is less than the lower switching sound pressure Va1 set in advance, and sets the selected input voice signal SN2R as the output voice signal SNtR. In contrast, the input selection section 3bR selects the input voice signal SN3R when the sound pressure VR exceeds the upper switching sound pressure Va2, and sets the selected input voice signal SN3R as the output voice signal SNtR.

The input selection section 3bR outputs the output voice signal SNtR set as described above, to the communication unit 4R. Thus, the input selection section 3bR sets the reflection degree RF1R of the input voice signal SN2R and the reflection degree RF2R of the input voice signal SN3R in the output voice signal SNtR, according to the sound pressure VR of the detected voice signal SNR. In this example, the input selection section 3bR sets the reflection degrees RF1R, RF2R such that one of them is set as "reflected" and the other of them is set as "not reflected".

The communication unit 4R wirelessly transmits the sound pressure information JR1 from the output control section 3e to the outside of the earphone 91R. A wireless transmission method is Bluetooth (registered trademark), for example. Here, presence or absence of wireless transmission of the output voice signal SNtR, which was output from the input selection section 3bR, in the communication unit 4R is controlled by the communication control information JR2 from the output control section 3e. In other words, the communication control information JR2 includes a command to either permit or prohibit wireless transmission of the output voice signal SNtR. The communication section 4R controls the wireless transmission of the output voice signal SNtR based on this command.

The communication unit 4L receives the sound pressure information JR1 wirelessly transmitted from the communication unit 4R of the earphone 91R, and outputs it to the sound pressure difference evaluation section 3d. The sound pressure difference evaluation section 3d acquires the sound pressure VR from the sound pressure information JR1 output from the communication unit 4L, and compares a magnitude of the sound pressure VR with a magnitude of the sound pressure VL of the detected voice signal SNL acquired from the sound pressure detection section 3aL.

The sound pressure difference evaluation section 3d sets at least one of the output voice signals SNtL, SNtR as an output voice signal SNst to be wirelessly transmitted to the outside by the earphone system 91ST, depending on a magnitude relationship between the sound pressure VL and the sound pressure VR. In other words, the sound pressure difference evaluation section 3d determines whether the magnitude of the sound pressure VR of the fourth input voice signal is larger than the magnitude of the sound pressure VL of the first input voice signal, and sets at least one of the left side output voice signal and the right side output voice signal as the output voice signal to be transmitted to the outside, based on a determination result.

Next, the sound pressure difference evaluation section 3d outputs to the communication unit 4L, communication control information JL2 identifying the signal set as the output voice signal SNst, and the communication unit 4L wirelessly transmits the communication control information JL2 to the communication unit 4R of the earphone 91R. When receiving the communication control information JL2, the communication unit 4R outputs the received communication control information JL2 to the output control section 3e.

The operation of the sound pressure difference evaluation section 3d will be described in detail with reference to FIG. 10. FIG. 10 is a table showing a relationship among the magnitude of the sound pressure VL, the magnitude of the sound pressure VR, and the output voice signal SNst to be wirelessly transmitted to the outside by the earphone system 91ST. As shown in FIG. 10, the sound pressure difference evaluation section 3d sets the output voice signal SNtL as the output voice signal SNst to be wirelessly transmitted by the earphone system 91ST when determining that the magnitude of the sound pressure VR is larger than the magnitude of the sound pressure VL.

The sound pressure difference evaluation section 3d includes in the communication control information JL2, a command to perform wireless transmission of the output voice signal SNtL, and outputs it to the communication unit 4L. When determining that the magnitude of the sound pressure VR is smaller than the magnitude of the sound pressure VL, the sound pressure difference evaluation section 3d includes in the communication control information JL2, a command to stop wireless transmission of the output voice signal SNtL and outputs it to the communication unit 4L.

The communication unit 4L transmits the communication control information JL2 to the communication unit 4R, and performs or stops the wireless transmission of the output voice signal SNtL based on the command for the communication unit 4L included in the communication control information JL2. The communication unit 4R receives the communication control information JL2 transmitted from the communication 4L, and outputs it to the output control section 3e.

The output control section 3e includes in the communication control information JR2, a command to stop wireless transmission of the output voice signal SNtR when the communication control information JL2 includes the command to perform the wireless transmission of the output voice signal SNtL, and outputs it to the communication unit 4R. In contrast, the output control section 3e includes in the communication control information JR2, a command to perform the wireless transmission of the output voice signal SNtR when the communication control information JL2 includes the command to stop the wireless transmission of the output voice signal SNtL, and outputs it to the communication unit 4R. The communication unit 4R performs or stops the wireless transmission of the output voice signal SNtR based on the communication control information JR2 output from the output controller section 3e.

The earphone system 91ST alternatively selects the output voice signal with the lower ambient sound from the output voice signals in two earphones 91L, 91R, and wirelessly transmits it to the outside. This increases a recognition rate of the voice uttered by the speaker H in the AI assistant 81.

The earphone system 91ST detailed above is not limited to the configuration and the procedure described above, and may be modified to the extent that it does not depart from the gist of the invention.

As with the earphone 91A in the first modified example of the first embodiment, the earphones 91L, 91R can be include input mixing sections 3cL, 3cR (see FIG. 9), each of which performs the same operation as the input mixing section 3c, instead of the input selection sections 3bL. 3bR, respectively. For example, in the input mixing section 3cL, the input voice signals SN2L, SN3L are mixed at the respective sound pressure ratios of the reflection degrees RF1L, RF2L corresponding to the sound pressure VL of the detected voice signal SNL. A ratio of the sound pressures to be mixed linearly and gradually changes according to an increase or decrease in the sound pressure of the ambient sound around the main body 1L. The reflection degrees RF1L, RF2L are indexes indicating a degree to which the input voice signal SN2L is reflected in the output voice signal SNtL, and a degree to which the input voice signal SN3L is reflected in the output voice signal SNtL, respectively. Each of the indexes is, for example, a magnitude of sound pressure. Therefore, the ratio of the sound pressures is a ratio of the sound pressure of the input voice signal SN2L and the sound pressure of the input voice signal SN3L included in the output voice signal SNtL.

For example, as shown in FIG. 5, the reflection degree RF1L in the output voice signal SNtL is represented by Vmax/Vmin when the sound pressure VL has the value Va3, is represented by V2x/V3x when the sound pressure VL has the value Vax, and is represented by Vmin/Vmax when the sound pressure VL has the value Va4. Also, the reflection degree RF2L in the output voice signal SNtL is represented by Vmin/Vmax when the sound pressure VL has the value Va3, is represented by V3x/V2x when the sound pressure VL has the value Vax. and is represented by Vmax/Vmin when the sound pressure VL has the value Va4. Therefore, by using the input mixing sections 3cL, 3cR instead of the input selection sections 3bL, 3bR, the change in sound quality of the output voice signal SNst in response to an increase or decrease in the ambient sound becomes gradual and smooth. Thereby, the recognition rate of the voice, which is uttered by the speaker H, by the AI assistant 81 is maintained at a high level regardless of the sound pressure of the ambient sound around the main body 1L or the main body 1R. In addition, since the total sound pressure of the output voice signal SNst is constant and does not change abruptly in each of the earphones 91L, 91R with the input mixing sections 3cL, 3cR, regardless of the increase or decrease of the ambient sound, the recognition rate of the voice, which is uttered by the speaker H, by the AI assistant 81 is maintained at a higher level.

As with each of the earphones 91B, 91C, 91D in the second to fourth modified examples in the first embodiment, in the earphone system 91ST, the earphones 91L, 91R can include input mixing sections, each of which performs the same operation as each of the input mixing sections 3cB, 3cC, 3cD, instead of the input mixing sections 3cL, 3cR.

Wireless communication methods of the communication units 4, 4L, 4R are not limited to the above-described Bluetooth (registered trademark). Various methods can be applied to them. Also, although the communication units 4, 4L, 4R perform communication with the outside by wireless, they can perform communication with the outside by wire.

In each of the earphones 91, 91A to 91D, 91L, 91R which are the voice input apparatuses in the first embodiment, the first to fourth modified examples in the first embodiment and the second embodiment, the third microphone M3 is not limited to the above-described air-conduction microphone. The third microphone M3 can be a bone-conduction microphone which collects bone-conduction sound. FIG. 11 is a diagram illustrating an example of a mounting position when the third microphone M3 is the bone-conduction microphone. As illustrated in FIG. 11, the third microphone M3 is the bone-conduction microphone, and is positioned at the third position where the third microphone M3 tightly contacts with an inner surface of the ear canal E1 when the insertion portion 2 is inserted in the ear canal E1. At this position, the third microphone M3 collects bone-conduction sound of the voice which is uttered by the speaker H.

In the earphone system 91ST, the use states of the earphone 91L as the first voice input apparatus and the earphone 91R as the second voice input apparatus are not limited to the states in which the earphone 91L is worn on one ear of the speaker H and the earphone 91L is worn on the other ear of the speaker H. For example, a use state where the earphone 91L is worn on an ear of a first speaker and the earphone 91R is worn on an ear of a second speaker who differs from the first speaker, can be applied.

The index of each of the reflection degrees RF1L, RF2L, RF1, RF2 is not limited to the sound pressure. The index can be a physical quantity related to the sound quality or the like.

According to the voice input apparatus, the voice input system and the input voice processing method of the embodiments, even when the ambient sound is loud, it is possible to increase the recognition rate of the voice, which is uttered by the speaker, by the AI assistant.

What is claimed is:

1. A voice input system comprising:
a first voice input apparatus; and
a second voice input apparatus capable of communicating with the first voice input apparatus,
wherein each of the first voice input apparatus and the second voice input apparatus comprising;
a first microphone configured to collect a voice at a first position outside an ear canal of a speaker, and output a first input voice signal based on the collected voice;
a second microphone configured to collect a voice at a second position outside the ear canal of the speaker and closer to a mouth of the speaker than the first position, and output a second input voice signal based on the collected voice;
a third microphone configured to collect a voice inside the ear canal of the speaker, and output a third input voice signal based on the collected voice;
a controller configured to detect a sound pressure of the first input voice signal, set a first reflection degree indicating a reflection degree of the second input voice signal and a second reflection degree indicating a reflection degree of the third input voice signal according to the detected sound pressure, and generate an output voice signal including at least one of the second input voice signal and the third input voice signal based on the first reflection degree and the second reflection degree; and
a communication unit configured to transmit the output voice signal to an outside,
wherein the controller of the first voice input apparatus determines whether a magnitude of the sound pressure of the first input voice signal in the second voice input apparatus is larger than a magnitude of the sound pressure of the first input voice signal in the first voice input apparatus, and sets the output voice signal to be transmitted to the outside, based on a determination result.

2. The voice input system according to claim 1, wherein in each of the first voice input apparatus and the second voice input apparatus, the controller sets the first reflection degree and the second reflection degree as a mode in which one of two choices is selected, the two choices having one choice in which the first reflection degree is reflected and the second reflection degree is not reflected and another choice in which the first reflection degree is not reflected and the second reflection degree is reflected, and the controller sets as the output voice signal, one of the second input voice signal and the third input voice signal by selecting one of the two choices according to the detected sound pressure.

3. The voice input system according to claim 1, wherein in each of the first voice input apparatus and the second voice input apparatus, the controller sets the first reflection degree as a sound pressure ratio, and sets the second reflection degree as a sound pressure ratio, and the controller sets as the output voice signal, a mixed input voice signal generated by mixing the second input voice signal and the third input voice signal at respective sound pressure ratios corresponding to the detected sound pressure.

4. An input voice processing method comprising:

acquiring as a first input voice signal, a voice collected at a first position outside an ear canal of a left ear of a speaker;

detecting a sound pressure of the first input voice signal;

acquiring as a second input voice signal, a voice collected at a second position outside the ear canal of the left ear of the speaker and closer to a mouth of the speaker than the first position;

acquiring as a third input voice signal, a voice collected inside the ear canal of the left ear of the speaker;

setting a first reflection degree indicating a reflection degree of the second input voice signal and a second reflection degree indicating a reflection degree of the third input voice signal, according to the sound pressure of the first input voice signal;

generating a left output voice signal including at least one of the second input voice signal and the third input voice signal based on the first reflection degree and the second reflection degree;

acquiring as a fourth input voice signal, a voice collected at a first position outside an ear canal of a right ear of the speaker;

detecting a sound pressure of the fourth input voice signal;

acquiring as a fifth input voice signal, a voice collected at a second position outside the ear canal of the right ear of the speaker and closer to the mouth of the speaker than the first position;

acquiring as a sixth input voice signal, a voice collected inside the ear canal of the right ear of the speaker;

setting a third reflection degree indicating a reflection degree of the fifth input voice signal and a fourth reflection degree indicating a reflection degree of the sixth input voice signal, according to the sound pressure of the fourth input voice signal;

generating a right output voice signal including at least one of the fifth input voice signal and the sixth input voice signal based on the third reflection degree and the fourth reflection degree;

determining whether a magnitude of the sound pressure of the fourth input voice signal is larger than a magnitude of the sound pressure of the first input voice signal; and setting at least one of the left output voice signal and the right output voice signal as an output voice signal to be transmitted to an outside, based on a determination result.

5. An input voice processing method comprising:

acquiring as a first input voice signal, a voice collected at a first position outside an ear canal of a first ear of a speaker;

detecting a sound pressure of the first input voice signal;

acquiring as a second input voice signal, a voice collected at a second position outside the ear canal of the first ear of the speaker and closer to a mouth of the speaker than the first position;

acquiring as a third input voice signal, a voice collected inside the ear canal of the first ear of the speaker;

setting a first reflection degree indicating a reflection degree of the second input voice signal and a second reflection degree indicating a reflection degree of the third input voice signal, according to the sound pressure of the first input voice signal;

generating a first output voice signal including at least one of the second input voice signal and the third input voice signal based on the first reflection degree and the second reflection degree;

acquiring as a fourth input voice signal, a voice collected at a first position outside an ear canal of a second ear of the speaker;

detecting a sound pressure of the fourth input voice signal;

acquiring as a fifth input voice signal, a voice collected at a second position outside the ear canal of the second ear of the speaker and closer to the mouth of the speaker than the first position;

acquiring as a sixth input voice signal, a voice collected inside the ear canal of the second ear of the speaker;

setting a third reflection degree indicating a reflection degree of the fifth input voice signal and a fourth reflection degree indicating a reflection degree of the sixth input voice signal, according to the sound pressure of the fourth input voice signal;

generating a second output voice signal including at least one of the fifth input voice signal and the sixth input voice signal based on the third reflection degree and the fourth reflection degree;

determining whether a magnitude of the sound pressure of the fourth input voice signal is larger than a magnitude of the sound pressure of the first input voice signal; and setting at least one of the first output voice signal and the second output voice signal as an output voice signal to be transmitted to an outside, based on a determination result.

* * * * *